(12) United States Patent
Savitski et al.

(10) Patent No.: US 11,548,235 B2
(45) Date of Patent: Jan. 10, 2023

(54) LASER WELDING SYSTEM AND METHOD USING MACHINED CLAMPING TOOL

(71) Applicant: Dukane IAS, LLC, St. Charles, IL (US)

(72) Inventors: Alexander Savitski, Arlington Heights, IL (US); Paul H. Cathcart, St. Charles, IL (US); Grzegorz Zdzislaw Bugaj, Burbank, IL (US)

(73) Assignee: Dukane IAS, LLC, St. Charles, IL (US)

( * ) Notice: Subject to any disclaimer, the term of this patent is extended or adjusted under 35 U.S.C. 154(b) by 227 days.

(21) Appl. No.: 16/026,909

(22) Filed: Jul. 3, 2018

(65) Prior Publication Data
US 2020/0009798 A1    Jan. 9, 2020

(51) Int. Cl.
*B32B 41/00*    (2006.01)
*B29C 65/16*    (2006.01)
(Continued)

(52) U.S. Cl.
CPC ...... *B29C 65/1635* (2013.01); *B23K 26/0006* (2013.01); *B23K 26/22* (2013.01);
(Continued)

(58) Field of Classification Search
CPC ............ B29C 65/1635; B29C 65/7841; B29C 66/8122; B29C 66/45; B29C 66/8242;
(Continued)

(56) References Cited

U.S. PATENT DOCUMENTS

| | | |
|---|---|---|
| 4,266,667 A | 5/1981 | Ishigaki |
| 5,601,676 A | 2/1997 | Zimmerman |

(Continued)

FOREIGN PATENT DOCUMENTS

| | | |
|---|---|---|
| EP | 2813347 A1 | 12/2014 |
| FR | 2785564 A1 | 5/2000 |

(Continued)

OTHER PUBLICATIONS

JP 02266919 A, English abstract, Oct. 1990.*

(Continued)

*Primary Examiner* — Michael N Orlando
*Assistant Examiner* — Joshel Rivera
(74) *Attorney, Agent, or Firm* — Nixon Peabody LLP

(57) ABSTRACT

A laser welding system for joining first and second thermoplastic workpieces, and including a clamp, an actuator, and a laser source. The clamp includes first and second clamping structures positioned together to engage opposite sides of the workpieces when they adjoin each other. The first clamping structure has a non-flat or irregular surface, facing the first workpiece. The actuator causes the clamping structures to press the first and second workpieces together. The laser source applies laser radiation having a wavelength of 2 microns toward the workpieces to be joined, while they are pressed together by the clamp, to melt irradiated portions of the workpieces to one another. The first clamping structure transmits substantially all of the energy of the laser radiation through the material. The first workpiece has a non-flat or irregular surface facing the first clamping structure, which substantially conforms with the surface of the first clamping structure.

22 Claims, 4 Drawing Sheets

(51) Int. Cl.
  *B23K 26/00* (2014.01)
  *B23K 26/22* (2006.01)
  *B29C 65/78* (2006.01)
  *B29C 65/00* (2006.01)
  *B23K 37/04* (2006.01)
  *B29K 701/12* (2006.01)
  *B23K 103/00* (2006.01)

(52) U.S. Cl.
  CPC ...... *B23K 37/0443* (2013.01); *B29C 65/7841* (2013.01); *B29C 66/8122* (2013.01); *B23K 2103/42* (2018.08); *B29K 2701/12* (2013.01)

(58) Field of Classification Search
  CPC ............ B29C 65/1654; B29C 65/1616; B29C 66/1122; B29C 66/301; B29C 66/73366; B29C 66/73921; B29C 66/81267; B29C 66/81423; B29C 66/81431; B29C 66/8322; B23K 26/0006; B23K 26/22; B23K 37/0443; B23K 2103/42; B23K 26/082; B23K 26/324; B23K 26/244; B29K 2701/12
  USPC .......... 156/272.8, 60, 64, 350, 351, 378, 379
  See application file for complete search history.

(56) References Cited

U.S. PATENT DOCUMENTS

| | | | |
|---|---|---|---|
| 6,465,757 | B1 | 10/2002 | Chen |
| 9,453,631 | B2 * | 9/2016 | Sagesaka ............ B29C 65/1654 |
| 2001/0028567 | A1 | 10/2001 | Akiyama |
| 2003/0196750 | A1 | 10/2003 | Sakai |
| 2004/0080573 | A1 * | 4/2004 | Buchanan ......... B29C 66/81431 347/47 |
| 2004/0108040 | A1 | 6/2004 | Field et al. |
| 2005/0121137 | A1 | 6/2005 | Kirkland |
| 2006/0105077 | A1 | 5/2006 | Keller |
| 2006/0134994 | A1 | 6/2006 | Yasuda |
| 2006/0237129 | A1 | 10/2006 | Chen |
| 2006/0283544 | A1 | 12/2006 | Mori |
| 2008/0077173 | A1 | 3/2008 | Flanagan |
| 2010/0191148 | A1 * | 7/2010 | Matsumura ............ A61B 5/151 600/583 |
| 2010/0247822 | A1 | 9/2010 | Ziolkowski et al. |
| 2011/0100963 | A1 * | 5/2011 | Mangols ............... B29C 66/114 219/121.63 |
| 2011/0200802 | A1 | 8/2011 | Li |
| 2013/0022766 | A1 * | 1/2013 | Butzke ................. B29C 66/929 428/35.7 |
| 2013/0320276 | A1 | 12/2013 | Farrell |
| 2014/0069921 | A1 | 3/2014 | Kristal |
| 2015/0083302 | A1 | 3/2015 | Sawada |
| 2015/0124461 | A1 | 5/2015 | Sagesaka et al. |
| 2017/0182592 | A1 | 6/2017 | Savitski |
| 2018/0071990 | A1 | 3/2018 | Savitski |
| 2018/0099456 | A1 | 4/2018 | Savitski |

FOREIGN PATENT DOCUMENTS

| | | | | |
|---|---|---|---|---|
| JP | 02266919 | A | * 10/1990 | ....... B29C 66/83221 |
| JP | 2002067164 | A | 3/2002 | |
| JP | 2004050513 | A | 2/2004 | |
| JP | 2004063332 | A | 2/2004 | |
| JP | 2004142225 | A | 5/2004 | |
| JP | 2007230051 | A | 9/2007 | |
| JP | 2009119024 | A | 6/2009 | |
| JP | 2009119807 | A | 6/2009 | |
| JP | 5288867 | B2 | 9/2013 | |
| JP | 2014034166 | A | 2/2014 | |
| JP | 2017130445 | A | 7/2017 | |
| WO | WO 2016/024427 | A1 | 2/2016 | |

OTHER PUBLICATIONS

"Plastic Racing Into the Future" Indianapolis ANTEC '96—vol. 1—Processing 1996, Copyright © 1996 By The Society of Plastics Engineers, 9 pages.

"Infrared Welding of Thermoplastics, Colored Pigments and Carbon Black Levels on Transmission of Infrared Radiation"., by Robert A. Grimm and Hong Yeh—Edison Welding Institute, 7 pages.

"Application With Infrared Welding of Thermoplastics"., by David A. Grewell, Branson Ultrasonics Corporation, 5 pages.

Forward to Better Understanding of Optical Characterization and Development of Colored Polyamides for the Infra-Red/Laser Welding: Part I—Efficiency of Polyamides for Infra-Red Welding., by Val Kagan, Robert Bray and A1 Chambers—Honeywell International, Engineered Applications & Solutions, Morristown, NJ 07962-2332, USA, 7 pages.

"Three Approaches in Utilizing High Power Diode Laser to Join Therrnoplastics"; by Steven A. Kocheny—Lester Technologies, LLC., and Jerry Zybko—Lester Technologies, LLC., 5 pages.

"Comparative Investigations on Quasi-Simultaneous Welding on the Basis of the Materials Peek and PC", by H. Potente, G. Fiegler, F. Becker and J. Korte—University of Paderborn, Paderborn, Germany, 5 pages.

"3D-Laser Transmission Welding", by H. Haberstroh, R. Luetzeler—Institut für Kunststoffverarbeitung, Aachen, Germany, 6 pages.

International Search Report and Written Opinion of International Searching Authority for Application No. PCT/US2004/040791, dated Jul. 2, 2007 (6 pages).

Rennert et al.; "Laser-adapted construction for plastic welding"; retrieved on Jan. 15, 2007 from http://www.rofin.com/deutsch/anwendunen/laser-mikro-micro/data/E_PlastEurope02-04_Laser_adapted_Construction.pdf (page 6, column 1).

International Search Report and Written Opinion of International Searching Authority for Application No. PCT/US2017/051734, dated Dec. 6, 2017 (10 pages).

"Klara Sicht mit neuem Licht"; Kunststoffe, Jun. 1, 2015, pp. 26-29, in German; XP055199510 (4 pages).

International Search Report and Written Opinion of International Searching Authority for Application No. PCT/US2017/054684, dated Jan. 16, 2018 (12 pages).

International Search Report and Written Opinion of International Searching Authority for Application No. PCT/US2019/040380, dated Nov. 11, 2019 (20 pages).

* cited by examiner

LASER WELDING SYSTEM AND METHOD USING MACHINED CLAMPING TOOL

FIELD OF THE INVENTION

The present disclosure relates generally to laser welding of thermoplastic materials and, more particularly, to laser welding that uses laser radiation having a 2-micron wavelength with a fluorinated ethylene propylene clamping tool to weld thermoplastic parts having complex or irregular surfaces to be joined together.

BACKGROUND OF THE PRESENT DISCLOSURE

Laser welding uses a laser beam to melt thermoplastic material in a joint area by delivering a controlled amount of energy to a precise location. Systems have been developed for controlling the beam size, and a variety of methods are available for precisely positioning and moving the beam. Laser welding is based on the same basic requirements of material compatibility as other welding techniques, but is often found to be more forgiving of resin chemistry or melt temperature differences than most other plastic welding processes. Nearly all thermoplastics can be welded using a proper laser source and appropriate joint design.

Conventional laser-welding processes for plastic materials most commonly utilize lasers emitting radiation having a wavelength of about around 1 micron, e.g., 808 nm, 960 nm, 980 nm, 1050 nm, or 1064 nm. At these wavelengths, thermoplastic materials do not absorb infrared radiation, and the welding process exploits a selective heating effect. In this broadly accepted approach the laser radiation is being transmitted through the upper part of the two parts to be joined and clamped together for welding, and is absorbed by the bottom part, which has a laser absorbing additive, most common of which is carbon black. If the surface of the upper part is flat, the clamping tools for this laser welding process normally incorporate a glass plate, which allows to apply clamping pressure on the assembly, while transmitting the laser beam being directed through it to the welding surface. When the upper surface has a curvature or a complex shape, the clamping tool is often made from some clear plastic easy to machine, most commonly Acrylic, which does not absorb laser radiation emitted by 1-micron lasers and transmits the laser beam to the workpieces with minimal power losses. These materials also have sufficient rigidity to transfer clamping force to the assembly being welded. However, they are suitable only for lasers having a wavelength of about 1 micron.

A laser-welding process that utilizes a 2-micron laser wavelength allows unfilled plastics to be welded without the presence of any laser sensitive additive, as most of the plastic materials can be melted with such a laser. This process offers a significant advantage compared to the welding process based on utilizing a 1-micron laser, which requires the presence of the laser sensitive additive in the bottom part of the assembly. However, a need exists for a laser welding process that uses a 2-micron laser wavelength for joining workpieces having complex or non-flat surface geometries. The materials used for making clamping fixtures in the 1-micron wavelength laser welding process are not suitable for 2-micron laser welding processes. The present disclosure addresses these and other needs and solves these and other problems. Heretofore, no artisan has determined which materials would be suitable for a 2-micron laser welding process, which can be machined or adapted for complex or irregular (non-flat) workpiece surface geometries.

SUMMARY OF THE PRESENT DISCLOSURE

The clamping requirements and the approaches to address them are essentially the same for both processes (1-micron and 2-micron), however as most plastics absorb laser radiation around the 2-micron laser wavelength, it makes it impossible to use such plastics for clamping the assembly, as such a tool would melt under the laser beam in the same way as the part being welded. Because it is impossible to transfer clamping force directly onto the welding area in cases when the outer surface is not flat, as using a sheet of glass is not an option, which makes clamping tooling for a 2-micron laser complex and time-consuming to manufacture.

Through careful research of material properties of commercially available plastics and direct experimentation, the inventors have established that one class of materials in particular, namely fluoropolymers such as fluorinated ethylene propylene (FEP), meets the competing requirements of having low power losses when transmitting the laser beam having a wavelength of 1940 nanometers (about 2 microns), as well as the material's ability to be processed and machined to conform to an irregular, complex, or non-flat shape. The measurements of power losses in FEP (e.g., marketed under the brand TEFLON) have shown that the power losses in this material are compatible with power losses in borosilicate glass when transmitting the laser beam with a wavelength of 1940 nanometers (about 2 microns). That makes FEP material and other fluoropolymer materials uniquely suitable for making clamping tools for welding process utilizing a 2-micron laser.

In accordance with an embodiment, a laser welding method is provided for joining portions of a pair of workpieces made of a thermoplastic material that absorbs laser radiation having a wavelength of about 2 microns (e.g., 1940 nm). The workpiece material does not have to be optically transparent. It can be of a natural color, like PE or PP, or many other thermoplastic materials which are not optically clear, but which are transparent to laser radiation. Or one or both workpieces can have a pigment, which is not necessarily a laser-absorbing agent like carbon black. Alternately, the workpieces can have a pigment that can absorb just a portion of the radiation, but have enough radiation transmitted to the interface and bottom part. The method includes clamping the thermoplastic workpieces between a pair of clamping tools, at least one of which is made of a plastic material that has substantially the same power loss as borosilicate glass when transmitting laser radiation having a wavelength of about 2 microns through the material. The laser radiation is directed onto the workpieces through a clamping tool to melt the irradiated portion of the workpieces while mechanically pressing them together. The laser radiation is then turned off and the workpieces are allowed to solidify before releasing them from the clamping tools. The clamping tool through which the laser radiation passes can be made of a fluoropolymer such as fluorinated ethylene propylene (FEP), which has substantially the same power loss as borosilicate glass when transmitting laser radiation having a wavelength of about 2 microns.

The power of the laser radiation and the movement path of the laser radiation along the clamped workpieces is controlled to melt the workpieces in the portions or areas to be joined. The baseplate can be made of a material that cannot transmit or is otherwise impervious to the laser radiation.

An actuator such as a pneumatic cylinder urges at least one of the clamping tools or plates toward the other clamping tool or plate to press the workpieces together, while laser radiation is applied to the portions of the clamped workpieces to be joined. The power of the laser radiation and the rate of movement of the laser radiation along the clamped workpieces can be controlled to melt uniformly the workpieces in the areas to be joined.

DETAILED DESCRIPTION OF ILLUSTRATED EMBODIMENTS

Figure 1:
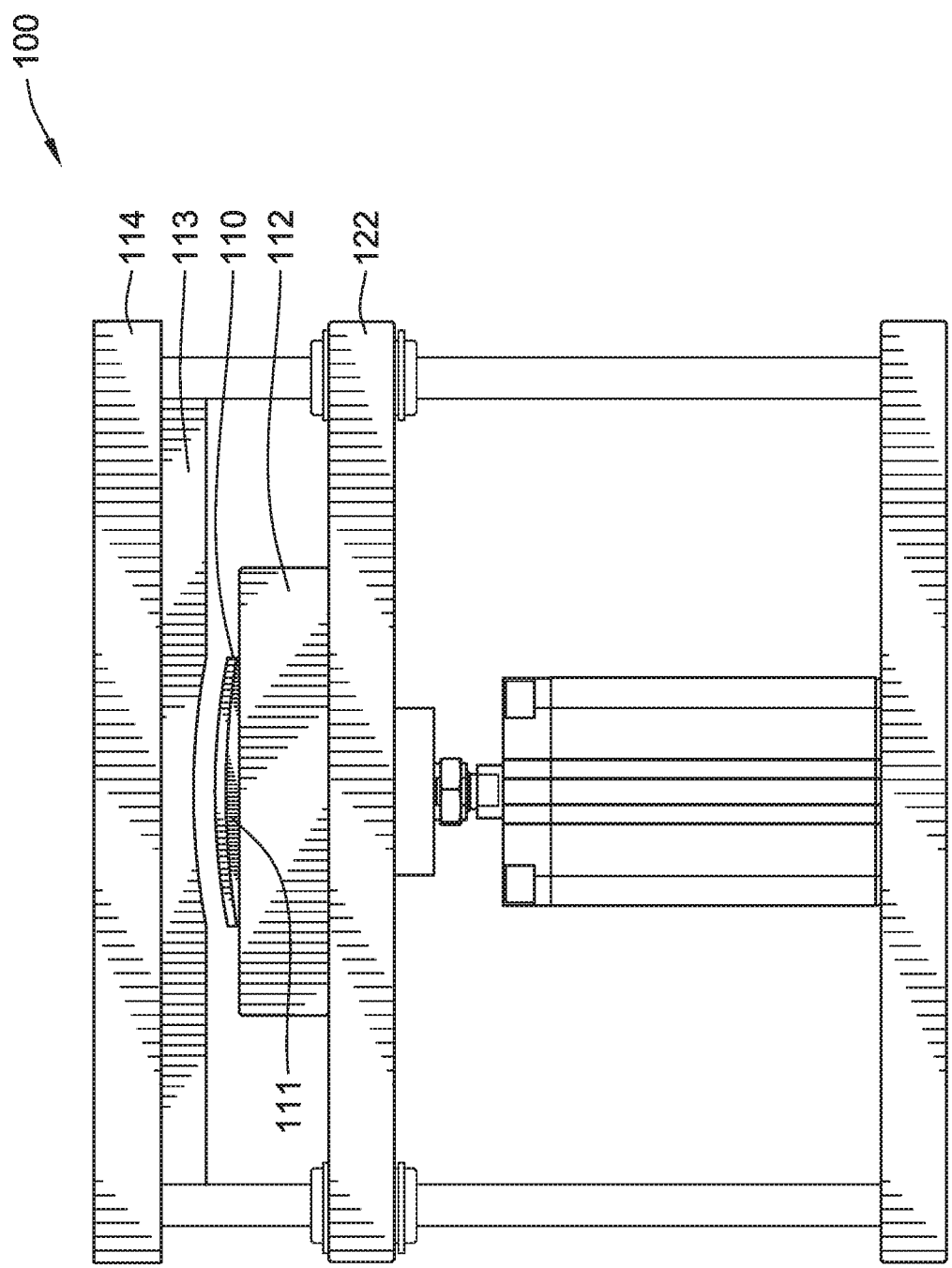
FIG. 1 is a side elevation of a laser welding arrangement for welding two thermoplastic sheets while clamping the two thermoplastic workpieces to be welded.

Although the present disclosure will be described in connection with certain preferred embodiments, it will be understood that the present disclosure is not limited to those particular embodiments. On the contrary, the present disclosure is intended to cover all alternatives, modifications and equivalent arrangements as may be included within the spirit and scope of invention as defined by the appended claims.

The laser radiation used in the embodiments disclosed herein can have a wavelength of about 2 microns (e.g., 1940 nm), which is capable of melting thermoplastic materials that do not contain any laser-sensitive additive whatsoever, such as carbon black, to absorb the laser radiation. As used herein, a clamping tool, claiming element, or clamping plate refer to a structure, which is not required to have a flat surface, used for clamping in conjunction with another clamping tool or element or plate. The term plate is not intended to convey that the clamping structure has a flat surface. On the contrary, the present disclosure advantageously discloses that fluoropolymer material, which is machinable yet allows transmission of 2-micron laser radiation, thereby allowing the clamping tool to have any shape or contour, as a surprisingly suitable material for use as a clamping tool in laser welding applications.

One or both of the clamping elements are made of a fluoropolymer such as fluorinated ethylene propylene (FEP). Through experimentation, the inventors have found that FEP clamping elements do not absorb a significant amount of laser radiation having about a 2-micron wavelength. In other words, substantially all of the laser radiation is transmitted through the fluoropolymer material, making fluoropolymers uniquely suitable for laser welding applications outside of the range of wavelengths between 808 nm and 1064 nm, such as 2 microns. Thus, the FEP clamping elements can transfer clamping forces directly onto the parts (workpieces) being welded, even when the outer surfaces of the parts are not flat, while also permitting transmission of substantially all (e.g., at least 90% or at least 91% or at least 92% or at least 93% or at least 94% or at least 95% or at least 96% or at least 97% or at least 98% or at least 99%) of the laser radiation onto the workpiece. The following Table 1 illustrates power loss measurements for FEP compared to borosilicate glass, which shows very comparable power losses among FEP and glass, making FEP a highly suitable substitute for glass while being machineable to readily conform the material's shape to match complex or irregular workpiece surfaces.

Power loss measurements for FEP (TEFLON)
Laser source: IPG Photonics 120W 1940 um

TABLE 1

| | Transfer Media | | | |
|---|---|---|---|---|
| Power setting (%) | No Media, Power meter reading (W) | FEP, 1/8-in, Power meter reading (W) | FEP, 1/4-in, Power meter reading (W) | Glass, 3/8-in, Power meter reading (W) |
| 20 | 11.00 | 10.3 | 10.6 | 10.3 |
| 20 | | 10.4 | 10.6 | 10.2 |
| 50 | 50.4 | 47.6 | 47.8 | 46.9 |
| 50 | | 46.9 | 48.2 | 46.8 |
| 80 | 91.9 | | 86.4 | 83 |
| 80 | | | 85.6 | 82.5 |
| 100 | 116 | | 109 | 108 |
| 100 | | | 108 | 107 |

Turning to the drawings, a laser welding arrangement 100 includes a pair of workpieces 110 and 111, which are held against each other in a "nest" 112 that has a top surface 113 machined to form a regular or irregular cavity that matches the configuration or surface contour of the lower surface 115 of the lower workpiece 111. Upper portions of the workpieces 110 and 111 extend above the nest 112 to engage a top clamping plate 113, which in turn engages a fixed top retaining plate 114, and a clamping plate 113 presses downwardly against the parts 110 and 111 to urge them against the bottom wall 113 of the nest 112. The nest 112 is supported by a bottom clamping plate 1122 that holds the workpieces 110 and 111 against the bottom wall 113 of the nest cavity 112a.

While the two workpieces 110 and 111 are pressed together, their adjoining surfaces are melted by laser radiation having a wavelength of about 2 microns (e.g., 1940 nm), which is capable of melting thermoplastic materials that do not contain any laser-sensitive additive to absorb the laser radiation. When 2-micron radiation is used, no such additive is required because most thermoplastic materials absorb radiation having that wavelength. The term "2-micron" as used herein encompasses 1940 nm.

At least that part of the clamping plate 113 through which the laser 120 passes is made of a fluoropolymer such as fluorinated ethylene propylene (FEP), which does not absorb any significant amount of laser radiation that has a 2-micron wavelength. Thus, the FEP clamping plate 113 can transfer clamping forces directly onto the upper workpiece 110. When the top surface 117 of the upper workpiece 110 is not flat, the lower surface 119 of the FEP clamping element 113 can be machined to match the top surface of the workpiece 110 where the clamping element 113 interfaces with the top surface 117 of the workpiece 110. In other words, it is not necessary for the entire lower surface 119 of the FEP clamping element 113 to have a non-flat or irregular or complex geometry. The lower surface 119 of the FEP clamping element 113 needs only to be non-flat, irregular, or complex in those areas where the clamping element 113 interfaces with the correspondingly non-flat, irregular, or complex top surface of the workpiece 110. The terms "upper," "lower," "top," or "bottom" are not intended to limit the orientation of the clamping elements and workpieces in an upright or vertical configuration, but rather to differentiate the different surfaces of the structures from one another.

Figure 3:
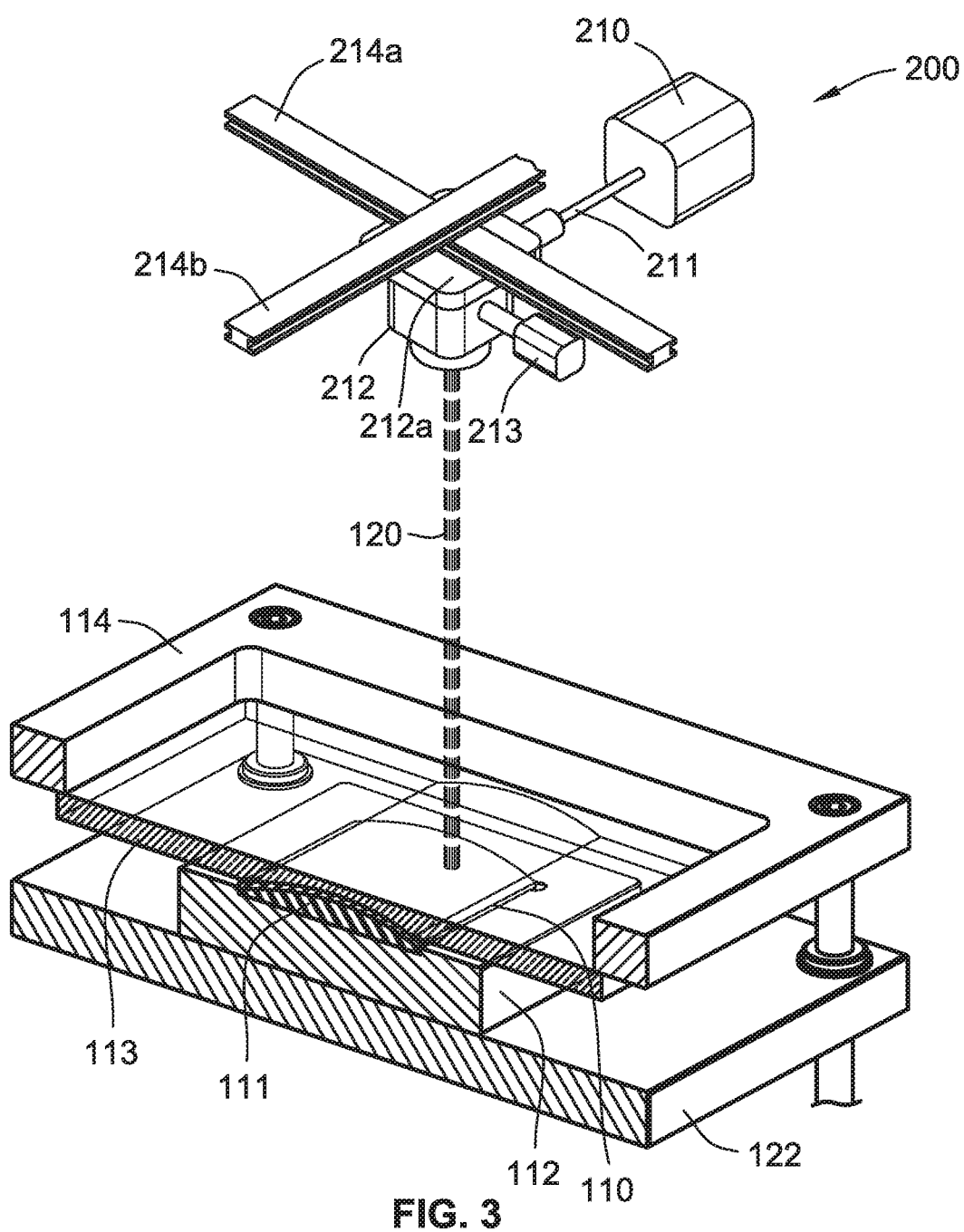
FIG. 3 is a sectioned perspective view of the laser welding arrangement shown in FIG. 1.

A laser assembly 200 shown in FIG. 3 includes a conventional laser source, which generates a laser beam 120 of radiation (shown in FIG. 3) having a wavelength of, e.g., about 2 microns (e.g., 1940 nm). The mount 212*a* is coupled to orthogonal gantries 214*a* and 214*b*. One or more scanner mirrors within the scan head 212 are controlled by a processor-controlled drive unit 213 to direct a laser beam 215 downwardly onto a stack 116 that includes two thermoplastic workpieces 110 and 111 to be joined by welding. The drive unit 213 is controlled to adjust the positions of the scanner mirrors to move the laser beam 120 in a manner required to illuminate a prescribed weld zone on the top surface of the stack 116.

Figure 2:
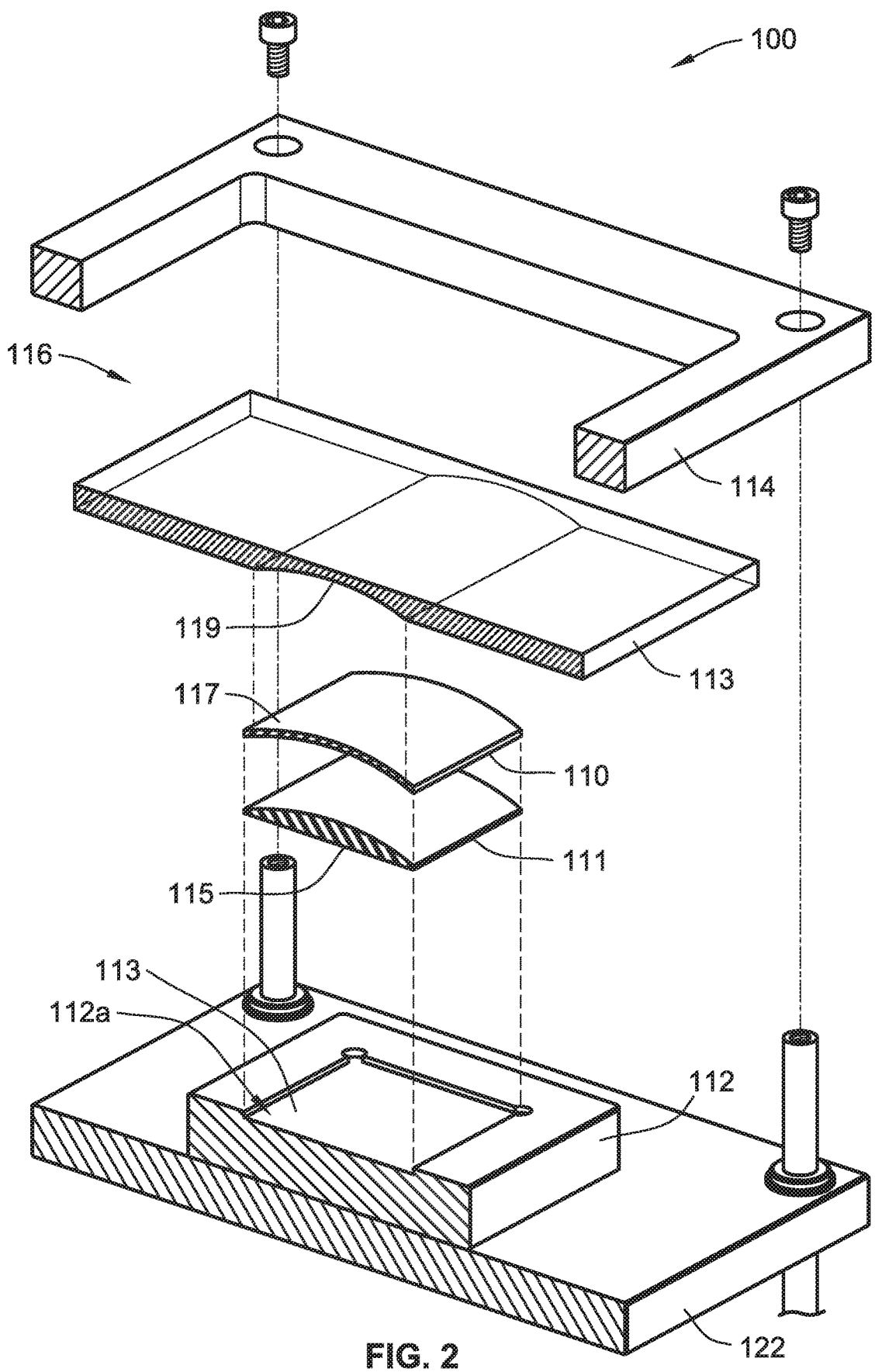
FIG. 2 is an exploded perspective view of the laser welding arrangement shown in FIG. 1.

As depicted in FIG. 2, the two thermoplastic workpieces 120 and 121 are clamped together by a pair of clamping plates 113 and 122. The upper plate 113 is transmissive, i.e., the laser beam 120 can pass through the upper plate with virtually no loss. This upper plate 113 can be made of glass. The lower plate 122 is non-transmissive, i.e., the laser 120 cannot penetrate the lower plate 122 and thus is diffracted against the lower plate 122, which is sometimes referred to in the art to which this disclosure pertains as a "nest" 112. Both clamping plates 113, 122 are rigid, and the lower plate 122 is preferably made of metal.

The upper clamping plate 113 is pressed downwardly on the upper workpiece 110 by a controllable actuator to clamp the workpieces 110 and 111 firmly against the lower plate 122. The downward pressure is maintained on the workpieces 110, 111 while the laser beam 120 traverses a prescribed or arbitrary weld zone or path, progressively heating impacted zones or areas of the thermoplastic workpieces to melt the thermoplastic material in the weld zone to fuse the workpieces together in that zone. The weld is then completed by allowing the workpieces 110, 111 to cool under pressure, thereby solidifying the thermoplastic material that was melted by the laser 120 in the weld zone. This heating and cooling of the thermoplastic materials progresses along the prescribed weld zone as the laser beam 120 is advanced along that zone, which typically extends around the entire circumference of the workpieces 110, 111, although any other predefined or arbitrary traversal path is contemplated herein. The particular traversal path that the laser follows is of no importance to the inventive aspects of the present disclosure.

In the exemplary embodiment illustrated in the drawings, the laser beam 120 is transmitted downwardly through the transparent upper clamping plate 113 and two sheets of thermoplastic material 110 and 111, which correspond to the workpieces 110, 111 to be welded. The two sheets 110 and 111 are optically transparent but nevertheless absorb part of the laser beam 120 when it is a 2-micron (2 μm.) fiber laser. Two-micron lasers are characterized by greatly increased absorption by unfilled polymers, which enables highly controlled melting through the thickness of the workpiece parts 110, 111, which can be optically clear without the need of any laser sensitive additives. The heat produced by the partial absorption of the laser beam 120 in both sheets 110 and 111 melts the material in the sheets sufficiently to cause them to fuse together along the path of the laser beam 120 as the upper clamping plate 113 continuously presses the two sheets 110, 111 against each other, thereby producing the desired welding of the two sheets 110, 111 of thermoplastic material in the weld zone traversed by the laser beam 120. The resulting weld seam is a clear weld where the two clear workpieces are fused together.

Figure 4:
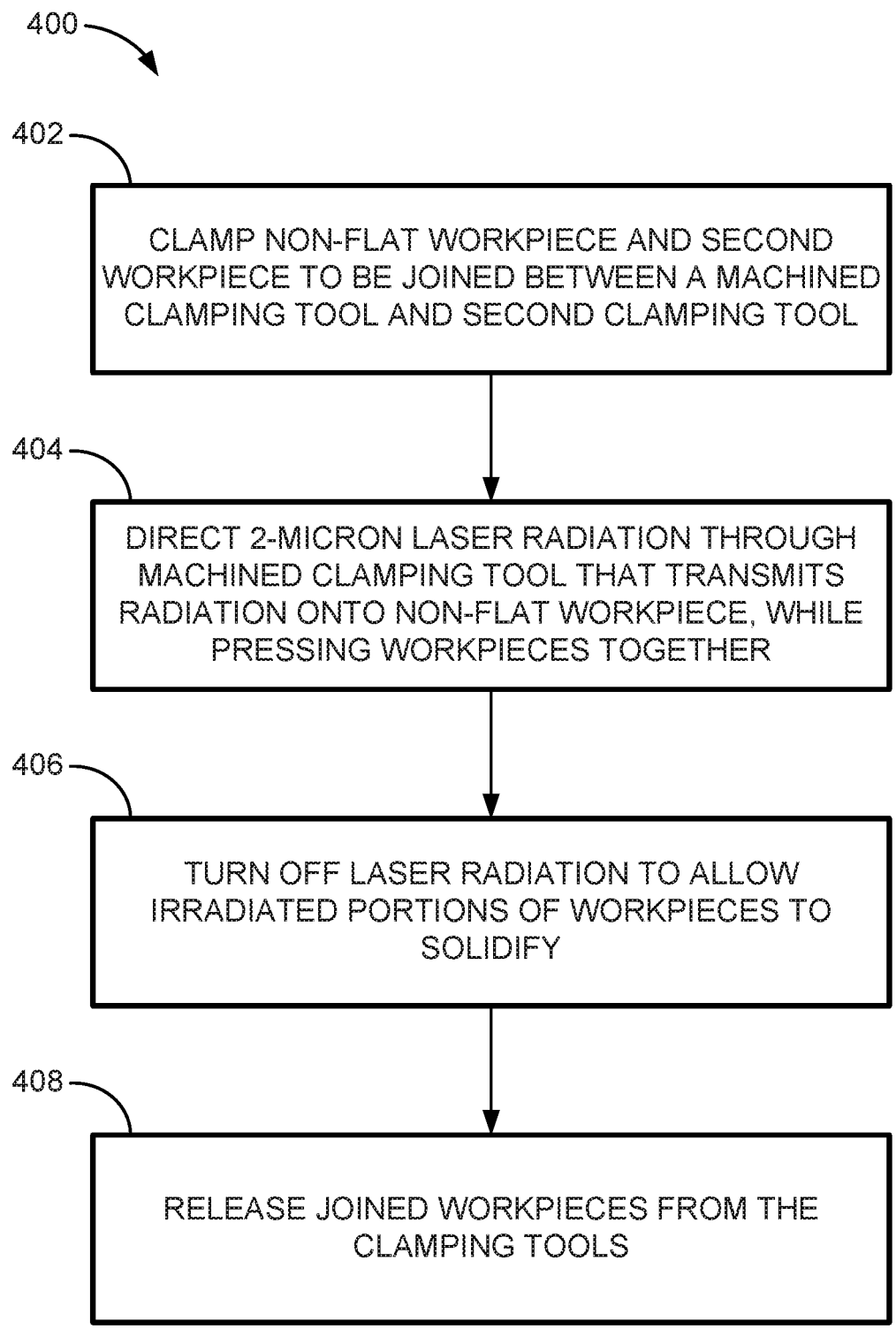
FIG. 4 is a flow chart diagram of a method of laser welding workpieces according to an aspect of the present disclosure.

FIG. 4 illustrates a flowchart of an example laser welding method 400 for joining portions of a first workpiece and a second workpiece where the workpieces are made of thermoplastic material that absorbs laser radiation having a wavelength of about 2 microns. The method 400 includes clamping a non-flat workpiece and a second workpiece (that can be flat or non-flat), which are to be joined together, between a machined clamping tool and a second clamping tool (which may or may not be machined) (402). A 2-micron laser radiation is directed through the machined clamping tool, which transmits the radiation onto the non-flat workpiece, while pressing both workpieces together, such as using a pair of clamping tools (404). The laser radiation is turned off to allow the irradiated portions of the workpieces to solidify to join them together (406). Finally, the joined workpieces are released from the clamping tools (408).

Aspects of the present disclosure are applicable but not limited to packaging of consumer goods, medical products, and other products that required sealed packages.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A laser welding method for joining portions of a first workpiece and a second workpiece, the workpieces being made of thermoplastic material that absorbs laser radiation having a wavelength of about 2 microns, the method comprising the steps of:

clamping together the portions of the first and second workpieces to be joined between a clamp having a first clamping structure and a second clamping structure, the first clamping structure being composed of a fluoropolymer material having a surface that is non-flat or irregular and that faces the first workpiece, directing laser radiation having a wavelength of about 2 microns onto the first workpiece through the first clamping structure to melt irradiated portions of the workpieces to one another, while mechanically pressing the workpieces together, wherein the fluoropolymer material of the first clamping structure transmits substantially all of the energy of the laser radiation through the material, the first workpiece having a non-flat or irregular surface facing the fluoropolymer material that substantially conforms with the non-flat or irregular surface of the fluoropolymer material, and turning off the laser radiation and allowing at least the irradiated portions of the first and second workpieces to solidify before releasing the joined workpieces from the clamp.

2. The laser welding method of claim 1, wherein the fluoropolymer is fluorinated ethylene propylene.

3. The laser welding method of claim 2, wherein the fluoropolymer material of the first clamping structure is made of fluorinated ethylene propylene having a surface that is machined to substantially match or follow a surface of at least the first workpiece to be welded.

4. The laser welding method of claim 2 in which the fluoropolymer material of the first clamping structure remains solid while the laser radiation is being transmitted through that first clamping structure to the first and second workpieces to be welded.

5. The laser welding method of claim 1 in which the first and the second workpieces include optically transparent sheets of a thermoplastic material.

6. The laser welding method of claim 1 in which the first and the second workpieces are made of thermoplastic materials that absorb a portion of the laser radiation, so that the first and the second workpieces are heated by the laser radiation.

7. The laser welding method of claim 6 in which the power of the laser radiation and the rate of movement of the laser radiation along the clamped first and second workpieces are controlled to melt the first and the second workpieces in the areas to be joined.

8. The laser welding method of claim 1 in which the second clamping structure is made of a material that is non-transmissive for the laser radiation.

9. The laser welding method of claim 1, wherein the surface of the first clamping structure includes a generally concave portion and the surface of the first workpiece includes a corresponding generally convex portion, or vice versa.

10. The laser welding method of claim 1, further comprising machining the surface of the first clamping structure to produce the non-flat or irregular surface thereof.

11. An apparatus, a part thereof being joined according to the laser welding method of claim 1.

12. A laser welding system for joining portions of a first workpiece and a second workpiece, the system comprising:
a first clamping plate having a surface that is non-flat or irregular and that is configured to engage a corresponding upper non-flat or irregular surface of the first workpiece, the first workpiece including a thermoplastic material that lacks a laser-absorbing additive;
a second clamping plate;
a nest extending from an upper surface of the second clamping plate, the nest having a surface configured to match a configuration or surface contour of a corresponding lower surface of the second workpiece, the second workpiece including a thermoplastic material that lacks a laser-absorbing additive;
an actuator configured to cause at least one of the first clamping plate or the second clamping plate to be urged toward the other to press the first and second workpieces together; and
a laser source configured to apply laser radiation having a wavelength of about 2 microns toward portions of the clamped first and second workpieces to be joined, while the workpieces are urged together, to melt irradiated portions of the workpieces to one another and form a clear weld seam, wherein (i) the first clamping plate comprises a fluoropolymer material that transmits at least 90% of the energy of the laser radiation through the first clamping plate and onto the portions of the workpieces and (ii) the second clamping plate and the nest comprise a material that is non-transmissive for the laser radiation, wherein a power loss for the laser radiation passing through the fluoropolymer material is within 96% of a power loss for the laser radiation passing through a glass material across a power setting of the laser source that is between 20% and 100% of a maximum power of the laser source.

13. The laser welding system of claim 12, wherein the fluoropolymer is fluorinated ethylene propylene.

14. The laser welding system of claim 12, further comprising the first and second workpieces, wherein the first and the second workpieces are made of thermoplastic materials that absorb a portion of the laser radiation, so that both of the workpieces are heated by the laser radiation.

15. A laser welding system for joining portions of a first workpiece and a second workpiece, the system comprising:
a clamp having a first clamping plate and a second clamping plate positioned together to engage opposite sides of the first and second workpieces when the workpieces are adjoining each other with respective contacting surfaces, the first clamping plate having a surface that is non-flat or irregular and is configured to face the first workpiece and engage a corresponding non-flat or irregular surface of the first workpiece, the first and second workpieces each including a thermoplastic material that lacks a laser-absorbing additive;
a nest extending from an upper surface of the second clamping plate, the nest having a surface configured to match a configuration or surface contour of a corresponding lower surface of the second workpiece;
an actuator configured to cause at least one of the first clamping plate or the second clamping plate to be urged toward the other to press the first and second workpieces together; and
a laser source applying laser radiation toward portions of the clamped first and second workpieces to be joined, while pressing the workpieces together, to melt irradiated portions of the workpieces to one another to form a clear weld seam, wherein the laser radiation has a wavelength outside of a range between 808 nm and 1064 nm, wherein (i) the first clamping plate comprises a fluoropolymer material that transmits at least 90% of the energy of the laser radiation through the first clamping plate and onto the portions of the workpieces and (ii) the second clamping plate and the nest comprise a material that is non-transmissive for the laser radiation, wherein a power loss for the laser radiation passing through the fluoropolymer material is within 96% of a power loss for the laser radiation passing through a glass material across a power setting of the laser source that is between 20% and 100% of a maximum power of the laser source.

16. The laser welding system of claim 12, wherein the non-flat or irregular surface of the first clamping structure includes a generally concave portion and the non-flat or irregular surface of the first workpiece includes a corresponding generally convex portion, or vice versa.

17. The laser welding system of claim 12, further comprising a fixed top retaining plate configured to engage the first clamping plate.

18. The laser welding system of claim 12, wherein the surface of the nest and the corresponding lower surface of the second workpiece are flat.

19. The laser welding system of claim 12, further comprising a scan head and a processor-controller drive unit configured to cause the laser source to direct the laser direction along a weld path to form the clear weld seam.

20. The laser welding system of claim 12, wherein the first clamping plate has a thickness that is between about 0.125 inches and about 0.25 inches.

21. The laser welding system of claim 15, further comprising the first workpiece and the second workpiece.

22. The laser welding system of claim 15, wherein the first clamping plate has a thickness that is between about 0.125 inches and about 0.25 inches.

* * * * *